INVENTOR:
James F. Spielman

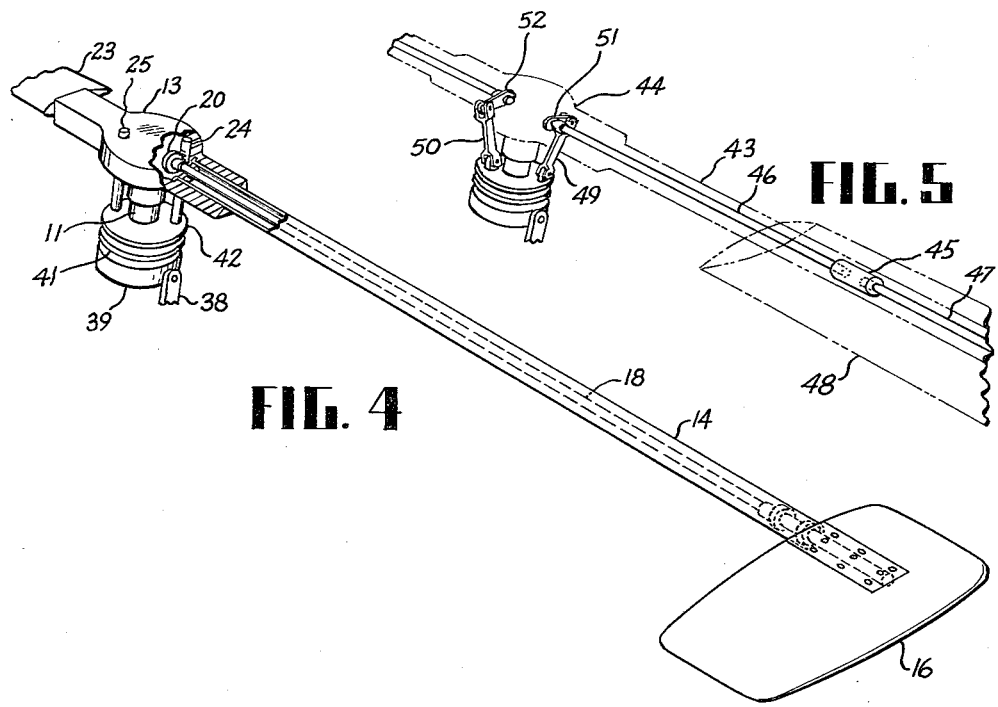
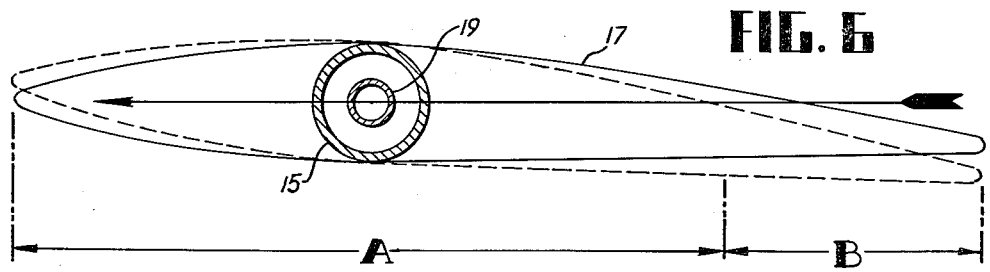

United States Patent Office 3,006,418
Patented Oct. 31, 1961

3,006,418
HELICOPTER ROTOR CONTROL DEVICES
James F. Spielman, North Road, Bantam, Conn.
Filed Mar. 23, 1959, Ser. No. 801,178
4 Claims. (Cl. 170—160.24)

The invention relates to a new and useful control plan for helicopter rotors, having certain inherent advantages toward simplifying control of helicopters and improving their efficiency.

Helicopters presently in use are made with rotor wings of long slender construction, and having a narrow chord in relation to the span or diameters. One reason for this form of construction is to overcome a problem which is present in rotor wings having a wide chord or large lifting area, in that adjustment of the rotor suddenly to a lifting condition, or positive angle of incidence, will exert sudden extreme lifting force and cause load failure of the rotor wings. Rotor wings having large areas are also very responsive to minute changes in angle of incidence whereas to make hovering difficult. Therefore, helicopter design has centered around the use of rotor wings having small lifting areas, and which rotate at great speed to provide lift, depending partly on centrifugal force of the rotor wings for support against bending failure.

The accompanying drawings and following description will bring to light a control plan for helicopter rotors which overcomes control problems formerly prohibiting the use of rotor wings having a wide chord or large lifting area, provides for greater lifting capability, permits design with smaller rotor diameter or span, and eliminates necessity for a manually operated cyclic pitch control.

The primary object of the invention is to provide an exact lifting adjustment control means for helicopters using rotors having a wide chord or large lifting area.

Another object of the invention is to provide a helicopter rotor which may have a small diameter or span.

Another object of the invention is to provide for automatic cyclic pitch control for helicopters.

Another object of the invention is to provide simplified control mechanism for helicopter rotors.

Figure 1:
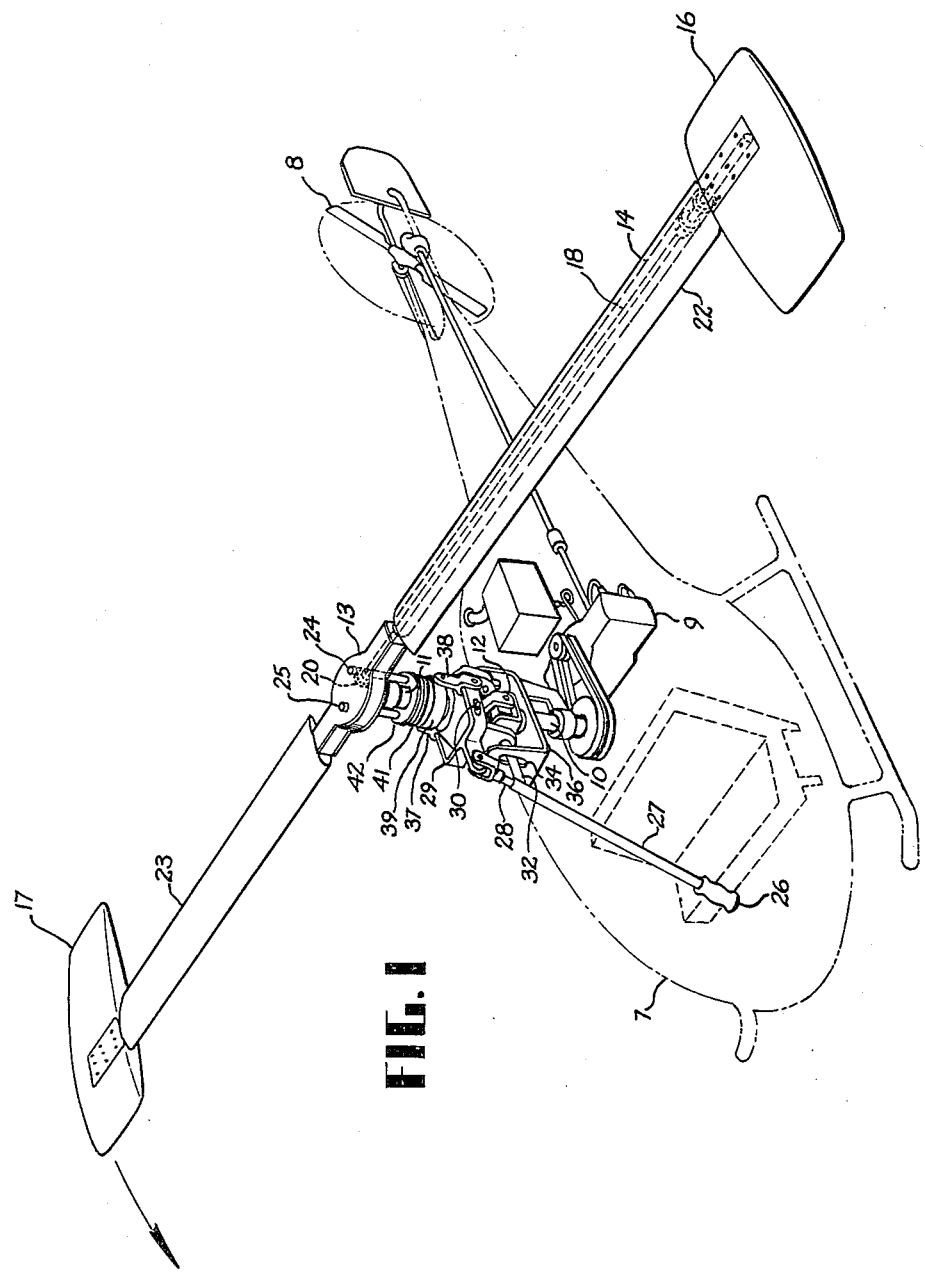
Figures 2, 3:
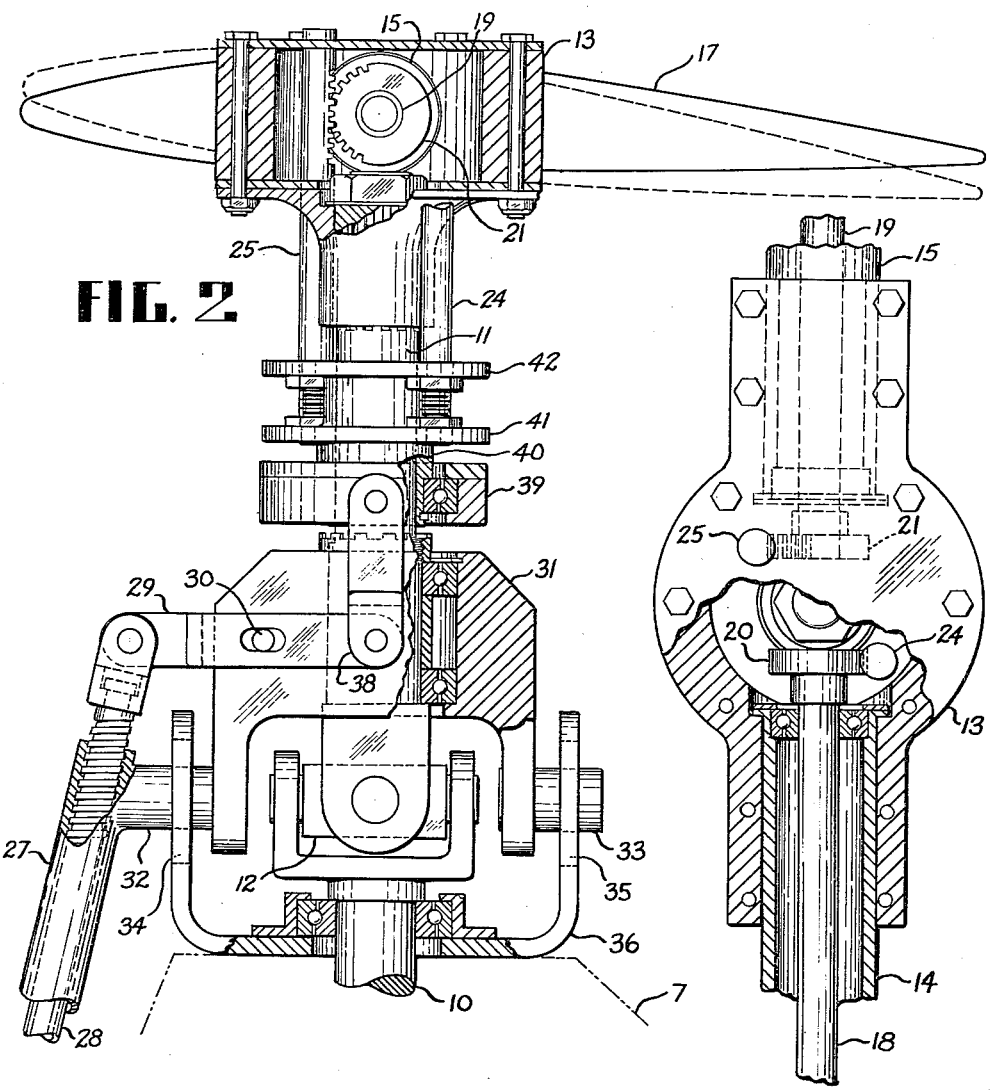

Additional advantages of the invention will become evident in the following description of the drawings, in which FIG. 1 is a perspective view of a helicopter having a portion illustrating certain elements of the invention; FIG. 2 is an enlarged cut-away side elevation of the rotor head area seen in FIG. 1, and illustrating one mechanism for manual operation of elements of the invention; FIG. 3 is a top view of FIG. 2 with cut-away portions; FIG. 4 is a perspective view of one of the rotor wings seen in FIG. 1 with the fairing removed and further illustrating the invention; FIG. 5 is a perspective view of a rotor blade embodying departures from the primary illustration of the invention; and FIG. 6 is an airfoil cross-section and movement thereof, schematically illustrating the primary invention.

Referring first to FIG. 1, a typical helicopter fuselage 7 is shown having a conventional torque-compensating tail rotor 8 for directional control. An engine 9 is arranged to rotatively drive a vertically disposed main rotor shaft 10 by means of a pulley-belt system. The main rotor shaft 10 in turn rotates a shaft 11 through a universal joint 12. Rotary motion of the shaft 11 is carried to a horizontally disposed main rotor basically comprising a rotor hub 13, a pair of oppositely disposed support tubes 14 and 15, having fairings 22 and 23 respectively, and a pair of horizontally disposed rotor wings 16 and 17. A means for driving the main rotor about a vertical axis is thus illustrated.

The rotor support tubes 14 and 15 are non-rotatably and non-slidably carried in the rotor hub 13. A pair of rotor wing adjusting torque tubes 18 and 19 are mounted lineally through the rotor support tubes 14 and 15 respectively and are rotatable therewithin by bearings at their hub ends and by bearings toward their outward extending ends. A pair of gear segments 20 and 21 are fixed on the inward or hub ends of the torque tubes 18 and 19 respectively, and thus are arranged to rotate therewith. The rotor wings 16 and 17 are fixed horizontally on the outward ends of the torque tubes 18 and 19 respectively. Thus the torque tube 18, gear segment 20 and rotor wing 16 as a unit are arranged to be rotatable about a lineal axis of the torque tube 18; and the torque tube 19, gear segment 21 and rotor wing 17 as a unit are arranged to be rotatable about a lineal axis of the torque tube 19. The torque tubes 18 and 19 are flexible in torsion, that is, they will twist about their diametric centers if held rigidly at one end and are subjected to a rotative load at the other end, and the force required to twist them increases as the amount they are twisted increases. The torque tubes 18 and 19 are then resilient to a torsion load.

In the illustrated form of the invention, a pair of gear racks 24 and 25, engaged with the gear segments 20 and 21 respectively, can be moved vertically by manual control to rotate the gear segments 20 and 21, thereby to rotate the torque tubes 18 and 19 and effect the movement of the rotor wings 16 and 17 to angular positions as related to horizontal. This angle of the rotor wings in relation to the horizontal is known as pitch, angle of attack, or angle of incidence.

The above described torque tubes 18 and 19 and the rotor wings 16 and 17 constitute an example of the basic invention, and the theory of their operation will be hereinafter described.

The drawings, especially FIG. 2, show a mechanism combining conventional helicopter control elements to illustrate how full manual control of a helicopter using this new main rotor control plan can be accomplished. A control handle 26 (FIG. 1) at the lower end of a handle tube 27 is rotatable together with a control shaft 28 extending through the handle tube 27. Manual rotation of the control handle 26 causes the control shaft 28 to extend or retract at the top of the handle tube 27 because internal threads in the handle tube 27 mate with external threads on the control shaft 28. By this screwing movement, a bell crank fork 29 may be caused to pivot reciprocally about a pivot pin 30. The pivot pin 30 is carried in a control block 31. The shaft 11 is rotatably carried by bearings within the control block 31. The control block 31 rigidly carries a forward bearing rod 32 and an aft bearing rod 33, both aligned in the plane of the axes of the coupling pins of the universal joint 12. The forward bearing rod 32 is rigidly fastened to the handle tube 27. The forward bearing rod 32 and the aft bearing rod 33 pass freely through a pair of vertically disposed slots 34 and 35 respectively in a bracket 36 which is rigidly carried on the top of the fuselage 7. It can now be understood that the handle tube 27 may be used to tilt the axis of rotation of the main rotor. Tilting the rotor in this manner is the customary method for providing directional movement in helicopters.

A pair of links 37 and 38 are pivotally connected to the bell crank 29, and pivotally connected to a thrust ring 39. The thrust ring 39 is carried rotatably by bearings on a thrust sleeve 40. The thrust sleeve 40 is slidable on the shaft 11. Two flanges 41 and 42 are formed on the thrust sleeve 40 and are provided to base mount the gear racks 24 and 25 which are slidable vertically through holes in the rotor hub 13. It is now apparent that reciprocal pivoting of the bell crank fork 29 about the pivot pin 30, caused by rotation and counter-rotation of the handle 26, can impart vertical motion to the links 37 and 38, the thrust ring 39, the thrust sleeve 40 and the gear racks 24 and 25, while the shaft 11 is turning the main rotor. Thus the pitch of the rotor wings 16 and 17 may be adjusted simultaneously. This control is known as the collective pitch control.

Using the above described mechanical provisions as an example, a full understanding of the theory and operation of the invention can be understood as follows: With the engine 9 turning the main rotor in the direction of the arrow (FIG. 1) at a desired speed, usually within a certain constant speed range, a pilot may rotate the handle 26 to cause the gear racks 24 and 25 to simultaneously rise vertically. This movement in turn rotates the gear segments 20 and 21, and the rotor wings 16 and 17 are thereby collectively urged toward assuming a positive angle of incidence, or lifting angle, dotted lines FIGS. 2 and 6. The arrow FIG. 6 represents a horizontal plane and indicates the direction of movement of the rotor wing 17. The forward portion is known as the leading edge, and the aft portion is known as the trailing edge. Lifting load or wing loading is distributed over the entire wing area. The area "A" (FIG. 6) is in balance, that is, lift on one side of the torque tube 19 is counteracted by lift on the other side of the torque tube 19. Thus, lift or wing loading in the area "A" does not tend to rotate the torque tube 19. However, lift in the area "B" is counteracted or supported only by torsion loading in the torque tube 19. Thus the rotor wings 16 and 17, or other airfoils having properly designed cross-sections, moving through the air at great speed will have the area "B" trailing by air drag without causing lifting force until the pilot has twisted the torque tubes 18 and 19 to the degree where a positive angle of incidence of the rotor wings 16 and 17 is effected despite the resistance of the air on the area "B." It is now understood that the area "B" will bear the portion of the wing loading which it is required to carry, but only in balance with torsion loading in the torque tubes 18 and 19. If the pilot imposes an extreme torsion load on the torque tubes 18 and 19 toward effecting an extreme angle of incidence of the rotor wings 16 and 17 and excessive rate of ascent, the excessive loading on the area "B" against the inertia of the helicopter will still cause the rotor wings 16 and 17 to maintain only a slight positive angle of incidence and therefore a slow initial acceleration of ascent.

If the helicopter is moving forward with the rotor wings 16 and 17 each supporting their portion or half of the load, one rotor moving forward while the other is moving aft when the main rotor is, for example, ninety degrees to the direction of aircraft movement, the forward-moving rotor wing is moving faster through the air than the aft-moving rotor wing. In most present helicopters, this difference in lift must be compensated for by the use of a manually operated cyclic pitch control which decreases the angle of attack of the forward-moving rotor blade and increases the angle of attack of the aft-moving rotor blade to prevent upsetting the stability of the helicopter about its center of gravity. But, from the foregoing description, the invention is seen to automatically compensate for changes in velocity of air passing over the rotor wings 16 and 17 whereas to maintain their wing loadings. It is then also well understood that gusts of wind or changes in wind direction will not appreciably affect the stability of a helicopter using this new control plan. Persons skilled in helicopter engineering can readily see that proper mechanical provisions added to the rotor driving system will provide for conventional auto-rotation.

More than one main rotor embodying the invention may be used on a helicopter, and more or less than two support shafts or blades may be used on one main rotor.

The fairings 22 and 23 may or may not be arranged to have normal positive pitch according to design considerations.

Engineering efforts are required in the illustrated example of the invention to resolve correlation in speed of control movements, torsionability of the torque tubes 18 and 19, span of the rotor, and cross-sectional design and area distribution of the rotor wings.

FIG. 5 especially depicts how departures from the basic illustration can be made. A support tube 43 is rigidly fixed in a rotor hub 44. A wing adjusting shaft 46 will not twist appreciably under torsion, but has a torque resilient unit (torsion spring for example) 45 installed at its outward end and another wing adjusting shaft 47 fixed therefrom to a more conventional rotor wing 48. Thus, pitch adjustment of the wing 48 is made through torsion balance in the torque resilient unit 45. Further mechanism departure is seen in FIG. 5 where the means for rotating the wing adjusting shafts, 46 being an example, is accomplished through a pair of links 49 and 50 and a pair of bell cranks 51 and 52.

The objects of the invention are fulfilled. How the invention can be made in more than one way has been illustrated and described. The scope of the invention is pointed out in the following claims.

I claim:

1. A rotor blade for vertical take-off aircraft, said rotor blade comprising: a horizontally extending support, a rotor wing mounted in a horizontal plane on the said support, said rotor wing being rotatable relative to the said support about an axis running lineally through the said support, said rotor wing having a greater distance to the trailing edge thereof from the said axis than to the leading edge thereof from the said axis, means fixing said rotor wing against lineal translation relative to the said support, and control means extending lineally through the said support, said control means being rotatable about the said axis, said control means being rotatively flexible under torsion load, said control means at the extending end thereof being fixed to the said rotor wing, said control means at the hub end thereof having provision for connection to pilot controls in an aircraft on which the said rotor blade may be used, whereby the said control means may be adjusted rotatively about the said axis at pilot will to adjust the angle of incidence of the said rotor wing.

2. A helicopter rotor blade, said rotor blade comprising: a horizontally extending support, a rotor wing mounted in a horizontal plane on the said support, said rotor wing being rotatively movable relative to the said support about an axis running lineally through the said support, said rotor wing having a greater distance to the trailing edge thereof from the said axis than to the leading edge thereof from the said axis, means fixing said rotor wing against lineal movement relative to the said support, and control means extending linearly through the said support, said control means being rotatively movable about the said axis by pilot control whereby to adjust the angle of incidence of the said rotor wing about the said axis when the said rotor blade is in use on a helicopter, said control means being rotatively flexible under torsion loading.

3. A helicopter rotor blade, said rotor blade when in use comprising: a horizontally extending support, a shaft extending lineally through the said support, said shaft being rotatively flexible under torsion loading, said shaft being rotatable about a longitudinal axis thereof in the said support, means supporting the said shaft against lineal translation relative to the said support, a horizontally disposed rotor wing fixed on the extending end of the said shaft to be rotatable therewith and non-slidable relative thereto, said rotor wing having a greater distance from the trailing edge thereof to the said axis of rotation of the said shaft than from the leading edge thereof to the said axis of rotation of the said shaft, and means at the hub end of the said shaft for connection to controls in a helicopter on which the said rotor blade may be used whereby to provide for pilot controlled rotation of the said shaft.

4. A helicopter rotor, said rotor comprising: a central hub, said hub being arranged to rotate about a vertical axis when driven by a power source in a helicopter using the said rotor, a plurality of horizontally disposed rotor supports extending radially from the said hub, a respective shaft extending lineally through each of the said rotor supports, said shafts being rotatable about lineal axes thereof in the said rotor supports, said shafts being rotatively flexible under torsion loading, means fixing said shafts against lineal translation relative to the said rotor supports, horizontally disposed wings fixed one to each of the said shafts on the extending ends thereof whereby to rotate therewith about the said axes relative to the said rotor supports, means fixing said wings against lineal translation relative to the said shafts, said wings having a greater distance to the trailing edges thereof from the said shafts than to the leading edges thereof from the said shafts, and means on the hub ends of the said shafts for connection to pilot controls in a helicopter using the said rotor whereby to provide for pilot rotation of the said shafts to effect pitch adjustment of the said wings collectively.

References Cited in the file of this patent
UNITED STATES PATENTS

| | | |
|---|---|---|
| 2,534,353 | Hiller | Dec. 19, 1950 |
| 2,553,193 | Hodson | May 15, 1951 |
| 2,600,531 | Hafner | June 17, 1952 |
| 2,684,721 | Lloyd | July 27, 1954 |
| 2,757,745 | Verhage | Aug. 7, 1956 |